United States Patent
Stiesdal (10) Patent No.: US 9,134,075 B2
(45) Date of Patent: Sep. 15, 2015

(54) MODIFICATION OF A SPATIAL TEMPERATURE PROFILE ALONG A HEAT EXCHANGING ARRANGEMENT OF A THERMAL ENERGY STORAGE AND RECOVERY DEVICE

(75) Inventor: Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 462 days.

(21) Appl. No.: 13/562,345

(22) Filed: Jul. 31, 2012

(65) Prior Publication Data

US 2013/0068445 A1    Mar. 21, 2013

(30) Foreign Application Priority Data

Sep. 15, 2011    (EP) .................................... 11181336

(51) Int. Cl.
*F28D 20/00*    (2006.01)

(52) U.S. Cl.
CPC ........... *F28D 20/0056* (2013.01); *Y02E 60/142* (2013.01)

(58) Field of Classification Search
CPC ........................ F28D 20/0056; Y02E 60/142
USPC ............... 62/6; 165/4, 287; 60/659; 126/400
See application file for complete search history.

(56) References Cited

U.S. PATENT DOCUMENTS

| 4,181,508 | A | * | 1/1980 | Schmid et al. ................. 95/290 |
| 2005/0126172 | A1 | * | 6/2005 | Hudson et al. ................. 60/659 |
| 2008/0179039 | A1 | * | 7/2008 | Moilala et al. ..................... 165/4 |
| 2011/0061837 | A1 | * | 3/2011 | Jeter et al. ................ 165/104.14 |

FOREIGN PATENT DOCUMENTS

| DE | 2550863 A1 | 5/1976 |
| EP | 1544562 A2 | 6/2005 |
| EP | 2336700 A2 | 6/2011 |

\* cited by examiner

*Primary Examiner* — Emmanuel Duke (57) ABSTRACT

A thermal energy storage and recovery device is disclosed which includes (a) an arrangement having first and second ends, the arrangement is configured for guiding a flow of heat transfer fluid between the first second ends, (b) a heat storage material thermally coupled to the arrangement such that along a physical extension of the arrangement a thermal interaction region is formed for thermally coupling the heat transfer fluid with the heat storage material, (c) a fluid terminal connected to the arrangement via a branch duct of the arrangement, the branch duct is located between the first and second ends, and (d) a control device coupled to the fluid terminal and configured that a flow of fluid through the fluid terminal is controllable such that within the arrangement a spatial temperature profile along at least a portion of the thermal interaction region is adjustable. A method and system are also described.

14 Claims, 6 Drawing Sheets

FIG 6

MODIFICATION OF A SPATIAL TEMPERATURE PROFILE ALONG A HEAT EXCHANGING ARRANGEMENT OF A THERMAL ENERGY STORAGE AND RECOVERY DEVICE

CROSS REFERENCE TO RELATED APPLICATIONS

This application claims priority of European Patent Office application No. 11181336.6 EP filed Sep. 15, 2011. All of the applications are incorporated by reference herein in their entirety.

FIELD OF INVENTION

The disclosure relates to the field of temporarily storing thermal energy. In particular, the disclosure relates to a thermal energy storage and recovery device comprising a heat exchanging arrangement and a heat storage material. Further, the disclosure relates to a method for adjusting a temperature profile along a heat exchanging arrangement of a thermal energy storage and recovery device. Furthermore, the disclosure relates to a thermal energy storage and recovery system comprising such a thermal energy storage and recovery device.

BACKGROUND OF THE INVENTION

The production of electric power from various types of alternative energy sources such as for instance wind turbines, solar power plants and wave energy plants is not continuous in time. The production may be dependent on environmental parameters such as for instance wind speed (for wind turbines), sunshine intensity (for solar power plant) and wave height and direction (for wave energy plants).

SUMMARY OF THE INVENTION

There is very often little or no time correlation between energy production and energy demand.

One known approach to solve the problem of uncorrelated electric power production and electric power demand is to temporally store energy, which has been produced but which has not been demanded, and to release the stored energy at times at which there is a high demand. In the past there have been suggested many different methods to temporarily store energy. Suggested methods are for instance (a) mechanical energy storage methods e.g. pumped hydro storage, compressed air storage and flywheels, (b) chemical energy storage methods e.g. electrochemical batteries and organic molecular storage, (c) magnetic energy storage, and (d) thermal energy storage.

For temporarily storing thermal energy thermal energy storage and recovery devices are known, which comprise a heat storage material and an embedded heat exchanging arrangement being surrounded by the heat storage material. In a first operational mode for storing thermal energy within the heat storage material a hot heat transfer medium is guided through the heat exchanging arrangement. Thereby, the heat transfer medium transfers at least some of its thermal energy via the heat exchanging arrangement to the heat storage material. As a consequence, the heat transfer medium is cooled down and the heat storage material is heated up. In a second operational state for releasing thermal energy from the heat storage material a cold heat transfer medium is guided through the heat exchanging arrangement. Thereby, the heat storage material transfers at least some of its thermal energy via the heat exchanging arrangement to the heat transfer medium. As a consequence, the heat storage material is cooled down and the heat transfer medium is heated up.

When loading a thermal energy storage and recovery device with thermal energy ("first operational mode") a spatial temperature profile will develop along the physical extension of the heat exchanging arrangement. This can be easily understood because when entering the thermal energy storage and recovery device the heat transfer medium is hot and after having transferred at least some of its thermal energy to the heat storage material it will be cooled down. As a consequence, the temperature of the heat storage material near the inlet end of the heat exchanging arrangement will be higher than the temperature of the heat storage material near the outlet end of the heat exchanging arrangement. Similar considerations apply for the spatial temperature profile which will develop when thermal energy is released from the thermal energy storage and recovery device.

The described spatial temperature profiles will flatten in the course a plurality of thermal energy load and thermal energy release cycles. If such a flattening of the spatial temperature profile is not limited to an interior region of the thermal energy storage and recovery device but extends to the inlet end and the outlet end of the heat exchanging arrangement the available maximal temperature difference between the heat storage material and the heat transfer medium will be reduced. This has the disadvantage that thermal efficiency of thermal energy storage and recovery cycle will be reduced.

There may be a need for improving the temporal storage of thermal energy in particular with respect to the efficiency of a thermal energy storage and recovery cycles.

This need may be met by the subject matter according to the independent claims Embodiments are described by the dependent claims.

According to a first aspect, there is provided a thermal energy storage and recovery device. The provided a thermal energy storage and recovery device comprises (a) a heat exchanging arrangement having a first end and a second end, wherein the heat exchanging arrangement is configured for guiding a flow of a heat transfer fluid between the first end and the second end, (b) a heat storage material which is thermally coupled to the heat exchanging arrangement in such a manner that along a physical extension of the heat exchanging arrangement a thermal interaction region is formed for thermally coupling the heat transfer fluid with the heat storage material, (c) a fluid terminal, which is connected to the heat exchanging arrangement via a branch duct of the heat exchanging arrangement, wherein the branch duct is located between the first end and the second end, and (d) a control device, which is coupled to the fluid terminal and which is configured such that a flow of fluid through the fluid terminal is controllable in such a manner that within the heat exchanging arrangement a spatial temperature profile along at least a portion of the thermal interaction region is adjustable.

The described thermal energy storage and recovery device is based on the idea that by providing a branch duct at the heat exchanging arrangement in between the first end and the second end (heat transfer) fluid having a certain temperature may be (a) fed into the heat exchanging arrangement or (b) extracted from the heat exchanging arrangement in such a manner that a spatial temperature profile along an extension of the heat exchanging arrangement may be modified. In particular, the spatial temperature gradient along an extension of the heat exchanging arrangement may be increased (i.e. the temperature profile gets sharper) such that the temperature within a first section of the heat exchanging arrangement being adjacent to the first end is at least approximately constant and/or the temperature within a second section of the heat exchanging arrangement being adjacent to the second end is also at least approximately constant. Thereby, one end may be denominated the hot end and the other end may be denominated the cold end, because the temperature of the cold end is smaller than the temperature of the hot end.

In this respect it is mentioned that if the temperature within the first section and the temperature within the second section are at least approximately constant, in a first operational mode, wherein thermal energy is stored into the thermal energy storage and recovery device, the output temperature of the (cooled down) heat transfer fluid leaving the thermal energy storage and recovery device will be constant at least during a part of a corresponding load cycle. Accordingly, in a second operational mode, wherein thermal energy is released from the thermal energy storage and recovery device, the output temperature of the (heated up) heat transfer fluid leaving the thermal energy storage and recovery device will be constant at least during a part of a corresponding unload cycle. As a consequence, both for charging the thermal energy storage and recovery device and for discharging the thermal energy storage and recovery device benefit may be taken from the full temperature difference between the two ends. As a consequence, the efficiency of cycle comprising a thermal energy storage and thermal energy release will be optimized.

The term heat exchanging arrangement may be any physical device which allows (a) to guide the heat transfer fluid between the first end and the second end and (b) to thermally couple the heat transfer fluid to the heat storage material. The heat exchanging arrangement may be realized e.g. by a pipe which is surrounded by the heat storage material. Alternatively, the heat exchanging arrangement may be a container, which accommodates the heat storage material.

The term physical extension may particularly denote a length of the heat exchanging arrangement. In case the heat exchanging arrangement is realized by means of at least one tube, the physical extension may be in particular the length of the tube. In case the heat exchanging arrangement comprises curves, the physical extension is not the size or dimension within which the whole thermal energy storage and recovery device may be realized but the total or effective length of the heat exchanging arrangement respectively of the tube being used for the heat exchanging arrangement.

The hot or cold fluid being supplied to the heat exchanging arrangement via the fluid terminal may be the same type or a different type of fluid as compared to the heat transfer fluid.

The described control device may be realized by a data processing device, which based on appropriate software program(s) is capable of controlling the operation of the described thermal energy storage and recovery device. However, it is pointed out that the described control unit may also comprise hardware components such as e.g. valves for controlling the flow of the (heat transfer) fluid and actuators for controlling a setting of the valves. Thereby, the valves, which may be located close to the respective fluid terminal, may be realized e.g. by means of appropriate swivel doors and/or dam shutters.

It is mentioned that it is possible however not necessary that the first end and the second end of the heat exchanging arrangement are located on opposite sides of the heat exchanging arrangement. It is also possible that the first end and the second end of the heat exchanging arrangement are located at one and the same side of the thermal energy storage and recovery device. By placing the inlet end and the outlet end of the heat exchanging arrangement relatively close to each other a heat loss caused by long heat transfer fluid feeding pipes and/or long heat transfer fluid return pipes to or from the heat exchanging arrangement may be minimized.

According to an embodiment, the thermal energy storage and recovery device further comprises at least one further fluid terminal, which is connected to the heat exchanging arrangement via a further branch duct of the heat exchanging arrangement, wherein also the further branch duct is located between the first end and the second end and wherein the branch duct and the further branch duct are spatially distributed along the physical extension of the heat exchanging arrangement. This may provide that "thermal injections" by means of a hot or a cold heat transfer fluid may be carried out at different positions along (the physical extension of) the heat exchanging arrangement. As a consequence, an improved modification of the spatial temperature profile/gradient along (the physical extension of) the heat exchanging arrangement may be realized.

According to a further embodiment, a plurality of branch ducts with corresponding fluid terminals are provided along the heat exchanging arrangement, whereby the density of the branch ducts along the physical extension of the heat exchanging arrangement in an end region being located adjacent to the first end or to the second end is higher than the density of the branch ducts along the physical extension of the heat exchanging arrangement in an middle region being located in between the first end and the second end. This may provide that the spatial temperature profile may be best modified in those regions wherein the profile modification has the highest effect with respect to the (thermal) efficiency of a thermal energy storage and recovery cycle being carried out with the described thermal energy storage and recovery device.

According to a further embodiment, the control device is configured for controlling the flow of fluid through the various fluid terminals independent from each other. This may provide that for each fluid terminal the corresponding fluid flow may be controlled individually and appropriate heat inputs or heat outputs may be adjusted for each section of the heat exchanging arrangement which section is assigned to the respective branch duct.

According to a further embodiment, the fluid terminal and/or the further fluid terminal are configured for (a) allowing fluid to enter the heat exchanging arrangement and (b) preventing fluid to leave the heat exchanging arrangement.

Descriptively speaking, the fluid terminal and/or the further fluid terminal(s) is/are used only as (heat transfer) fluid inlets. This may provide that no heat transfer fluid may be lost from the heat exchanging arrangement and the temperature of the fluid, which is added to the exchanger arrangement in order to modify the spatial temperature profile, may be easily determined in order to obtain an optimal spatial temperature profile modification.

According to a further embodiment, the heat storage material comprises a solid material such as in particular sand, soil, ashes, stones and/or gravel. Of course, also other materials which may also relatively cheap and which comprise similar thermal properties may be used.

According to a further embodiment, the physical extension of the heat exchanging arrangement is at least 80 m. In another embodiment the heat exchanging arrangement is at least 500 m. In a further embodiment the heat exchanging arrangement is at least 1000 m.

By having a long physical extension of the heat exchanging arrangement and, as a consequence, by having a long thermal interaction region between the heat transfer fluid and the heat storage material, i.e. the region wherein the heat exchanging arrangement is placed in the heat storage material, it can be ensured that during the second operational mode (i.e. stored thermal energy is recovered from the thermal energy storage and recovery device) the temperature of the cold heat transfer fluid is increased to the same or nearly the same temperature value as the inlet temperature value of the hot heat transfer fluid. In this way, if the hot heat transfer fluid being provided to the thermal energy storage and recovery device during the first operational mode comprises a temperature value as high as a heated steam, the heated up heat transfer fluid may also comprise or may be converted to heated steam which then may be used directly to drive a steam turbine without any further heating means. Thereby, a high efficiency of the thermal energy storage capability of the described thermal energy storage and recovery device may be realized.

According to a further embodiment, the thermal energy storage and recovery device further comprises thermal insulator (a) for thermally isolating the whole thermal energy storage and recovery device from its environment and/or (b) for thermally isolating different compartments of the thermal energy storage and recovery device from each other. This may provide that the thermal energy storage and recovery device may be at least partially thermally decoupled from its surrounding environment and/or different compartments or regions of the device may be at least partially thermally decoupled from each other such that the effective size of the thermal energy storage and recovery device may be optimized in view of given operating conditions.

Thermally decoupling different compartments of the thermal energy storage and recovery device may further provide that due to a limited thermal conduction between the different compartments a reestablishing of a desired temperature profile may be achieved with a reduced amount of thermal energy being inserted into or being extracted from the heat exchanging arrangement and/or within a shorted amount of time.

According to a further embodiment, the thermal energy storage and recovery device further comprises (a) a first common feed pipe being connected to at least two first terminals being selected from the fluid terminal and the at least one further fluid terminal for inserting a hot fluid into the heat exchanging arrangement and/or (b) a second common feed pipe being connected to at least two second terminals being selected from the fluid terminal and the at least one further fluid terminal for inserting a cold fluid into the heat exchanging arrangement. Thereby, (i) the first terminals are different from the second terminals, (ii) the temperature of the hot fluid is higher than the temperature of the cold fluid, (iii) the hot fluid is used for heating up the heat transfer fluid within the heat exchanging arrangement and (iv) the cold fluid is used for cooling down the heat transfer fluid within the heat exchanging arrangement. This may provide that for effectively modifying the spatial temperature profile only two different reservoirs have to be provided, wherein a first reservoir being assigned to and comprising the hot (heat transfer) fluid is coupled to the first common feed pipe and the second reservoir being assigned to and comprising the cold (heat transfer) fluid is coupled to the second common feed pipe.

According to a further aspect, there is provided a method for adjusting a temperature profile along a heat exchanging arrangement of a thermal energy storage and recovery device as described above. The provided method comprises (a) guiding a flow of the heat transfer fluid between the first end and the second end and (b) controlling a flow of fluid through the fluid terminal in such a manner that within the heat exchanging arrangement a spatial temperature profile along at least a portion of the thermal interaction region is adjusted.

Also the described method is based on the idea that a disadvantageous deterioration of the spatial temperature profile along the heat exchanging arrangement, which after a certain number of thermal storage and thermal release cycles may lead to a reduced efficiency of the thermal energy storage and recovery device because of a reduced available temperature difference both when charging and when discharging the thermal energy storage and recovery device, may be eliminated or at least reduced. Therefore, by modifying the temperature profile along a heat exchanging arrangement in such a manner that a maximum temperature difference is available, the thermal efficiency of the thermal energy storage and recovery device may be maintained at a maximum level.

According to an embodiment, the fluid and/or the heat transfer fluid is a gaseous fluid and in particular a compressed gas.

The (heat transfer) fluid may be compressed air or a superheated steam at least when the (heat transfer) fluid is at its higher temperature. This may mean that when charging thermal energy into the described thermal energy storage and recovery device, the heat transfer fluid, which is inserted into the heat exchanging arrangement, is at least partially gaseous. When the heat transfer fluid leaves the heat exchanging arrangement it may have become liquid again. Correspondingly, when discharging or extracting thermal energy from the described thermal energy storage and recovery device, a cold liquid fluid may be heated up such that it is converted into a gaseous or at least partially gaseous steam. This may be in particular advantageous if the extracted thermal energy is used for driving a steam turbine which itself drives an electric power generator.

According to a further embodiment, (a) in a first operational mode, in which the heat storage material is supposed to receive thermal energy from the heat transfer fluid, the heat transfer fluid is transported from the first end and to the second end, and (b) in a second operational mode, in which the heat storage material is supposed to release thermal energy to the heat transfer fluid, the heat transfer fluid is transported from the second end and to the first end.

By employing different transport directions of the heat transfer fluid for different operational modes a high efficient thermal energy storage may be realized. Specifically, a combination of (a) the different transport directions for the two different operational modes and (b) a comparatively long physical extension of the a thermal interaction region within the thermal energy storage and recovery device (e.g. more than at least 80 m, more than at least 500 m or more than at least 1000 m) may allow for achieving an outlet temperature of the heat transfer fluid at least at some time during the second operational mode, which outlet temperature is not significantly smaller than the inlet temperature of the heat transfer fluid at least at some time during the first operational mode. This means that during the second operational mode the heat transfer fluid can be received from the thermal energy storage and recovery device almost with the same (high) temperature as compared to the temperature with which the heat transfer fluid has been provided to the thermal energy storage during the first operational mode. In this way, if the hot heat transfer fluid comprises heated steam, the heated up (originally) cold heat transfer medium may also comprise heated steam which then may be used directly to drive a steam turbine without any further heating means. Thereby, the efficiency of the heat storage and recovery process may be significantly increased.

The described principle of using (a) a first transport direction from the first end to the second end for charging the heat storage material with thermal energy and (b) an opposite second transport direction from the second end to the first end for discharging the heat storage material from thermal energy may be interpreted as employing a counter current principle.

Specifically, in the first operational mode (i.e. charging the heat storage material with thermal energy), a hot heat transfer fluid is let into the first end. After having transferred at least a part of its thermal energy the at least partially cooled down heat transfer fluid is returned at the second end. Correspondingly, in the second operational mode (i.e. discharging thermal energy from the heat storage material), a comparatively cold heat transfer fluid is let into the second end. After having received thermal energy from the heat storage material the at least partially heated up heat transfer fluid is returned at the first end.

In other words, when taking benefit from the described counter current principle the inlet end of the heat exchanging arrangement for hot heat transfer fluid when charging the thermal energy storage and recovery device may be the same as the outlet end of the heat exchanging arrangement for heated up heat transfer fluid when discharging the thermal energy storage and recovery device. Correspondingly, the outlet end of the heat exchanging arrangement for cooled down heat transfer fluid when charging the thermal energy storage and recovery device may be the same as the inlet end of the heat exchanging arrangement for cold heat transfer fluid when discharging the thermal energy storage and recovery device.

According to a further aspect, there is described a thermal energy storage and recovery system. The described thermal energy storage and recovery system comprises (a) a thermal energy storage and recovery device as described above, (b) a heat generating arrangement, which is connected directly or indirectly to the thermal energy storage and recovery device and which is configured to heat up heat transfer fluid, which is supposed to be transported to the thermal energy storage and recovery device, and (c) a heat consumption arrangement, which is connected directly or indirectly to the thermal energy storage and recovery device and which is configured to receive thermal energy from heat transfer fluid, which has been heated up by the thermal energy storage and recovery device.

The described thermal energy storage and recovery system is based on the idea, that when the above described thermal energy storage and recovery device co-operates with a heat generating arrangement and with a heat consumption arrangement a high efficient temporal heat storage and heat recovery process/cycle can be realized.

The heat generating arrangement may be any device which is capable of converting energy, in particular electric energy, into thermal energy. The generated respectively converted thermal energy is then transferred to the thermal energy storage and recovery device via the heat transfer fluid.

In case of a direct (thermal) connection between the thermal energy storage and recovery device and the heat generating arrangement, the heat transfer fluid being used by the thermal energy storage and recovery device may be the same as the operating medium of the heat generating arrangement. In case of an indirect connection different fluids may be used for the heat transfer fluid and for the operating medium. The thermal connection between the two fluids may then be realized by means of a heat exchanger and/or by means of a condenser.

The heat consumption arrangement may be any device, which is capable of converting thermal energy into mechanical and/or electric energy which may be fed for instance into a power grid.

In case of a direct (thermal) connection between the thermal energy storage and recovery device and the heat consumption arrangement, the heat transfer fluid being used by the thermal energy storage and recovery device may be the same as the operating medium of the heat converting arrangement. In case of an indirect connection different fluids may be used for the heat transfer fluid and for the mentioned operating medium. The thermal connection between the two fluids may then be realized for instance by means of a heat exchanger and/or by means of an evaporator.

It is mentioned that the described thermal energy storage and recovery device may also comprise two heat exchanging arrangements, in particular the above described heat exchanging arrangement and a further heat exchanging arrangement, wherein one of the two heat exchanging arrangements is associated with the heat generating arrangement and the other one of the two heat exchanging arrangement is associated with the heat consumption arrangement.

According to an embodiment, the heat generating arrangement is configured for generating a compressed hot gas being used for the heat transfer fluid in case the thermal energy storage and recovery device is in the first operational mode.

The described compression may be realized by means of an adiabatic compression. This may provide that the heat generation of the heat generating arrangement may be realized in an effective manner.

According to a further embodiment, the heat consumption arrangement comprises an expanding apparatus, which may be driven by an expanding heat transfer fluid being provided by the thermal energy storage and recovery device in case the thermal energy storage and recovery device is in the second operational mode.

The expanding apparatus may be mechanically coupled to an electric generator such that a high efficient energy conversion from (a) thermal energy which has been temporarily stored in the thermal energy storage and recovery device to (b) electric energy may be achieved.

It has to be noted that embodiments, have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiment to be described hereinafter and are explained with reference to the examples of embodiment. The disclosure will be described in more detail hereinafter with reference to examples of embodiment but to which the disclosure is not limited.

DETAILED DESCRIPTION

The illustration in the drawing is schematically. It is noted that in different figures, similar or identical elements are provided with the same reference signs or with reference signs, which are different from the corresponding reference signs only within the first digit.

Figure 1:
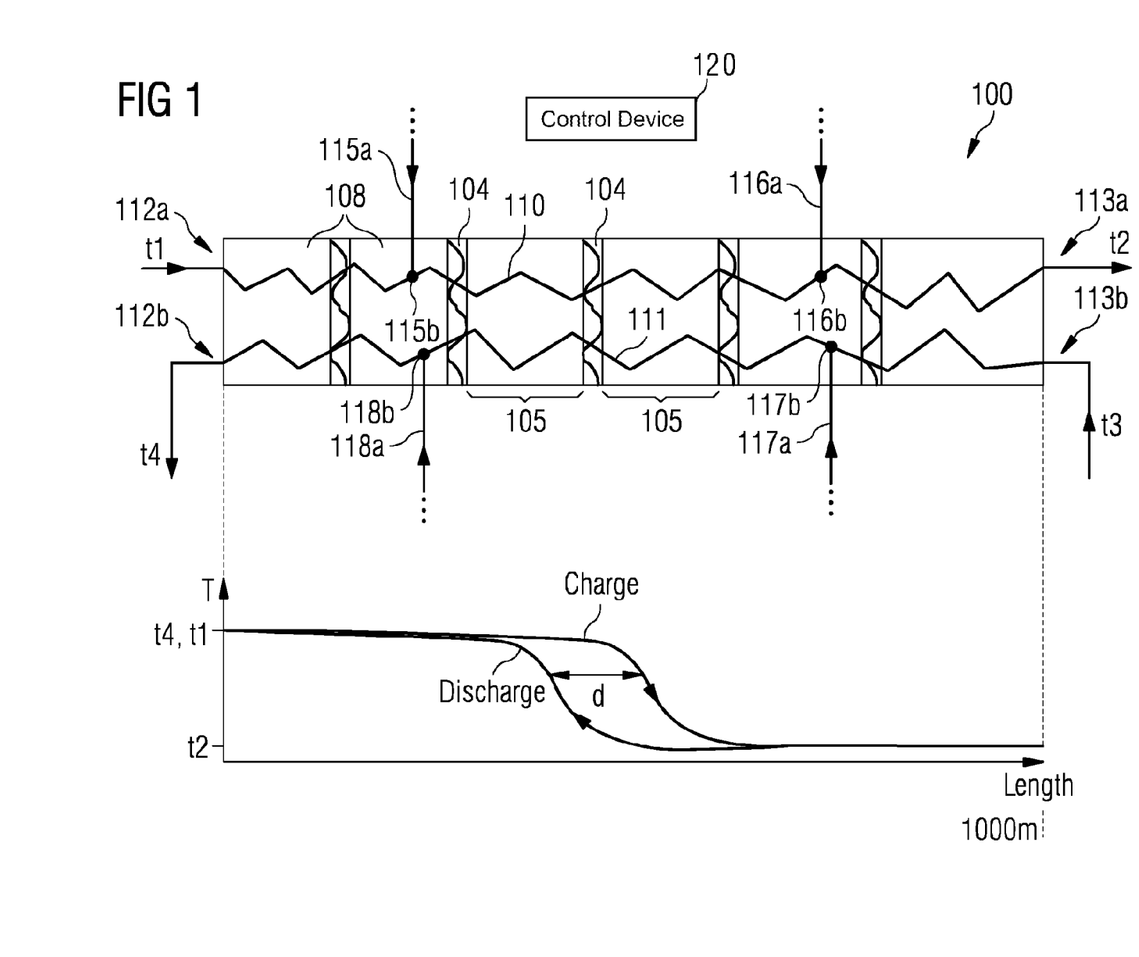
FIG. 1 shows a thermal energy storage and recovery device with a lengthy heat exchanging arrangement and the corresponding temperature behavior along the pipe of the lengthy heat exchanging arrangement.

FIG. 1 shows in accordance with an embodiment, a thermal energy storage and recovery device 100, which comprises a heat exchanging arrangement 110 and a further heat exchanging arrangement 111. Both heat exchanging arrangements 110 and 111 are embedded into a heat storage material 108. The heat storage material may be a solid material such as in particular sand, soil, ashes, stones and/or gravel. Of course, also other materials which may also relatively cheap and which comprise similar thermal properties may be used.

According to the embodiment described here the heat exchanging arrangements 110 and 111 have a physical extension of about 1000 m. As a consequence a physical/thermal interaction length between (a) the heat storage material 108 and (b) the heat exchanging arrangements 110 and 111 of about 1000 m is formed. Of course, also other physical extensions respectively physical/thermal interaction lengths may be employed.

As can be seen from FIG. 1, the thermal energy storage and recovery device 100 is divided into several compartments 105, which are separated or thermally isolated from each other via inner insulation walls 104.

The heat exchanging arrangement 110 further comprises an inlet end 112a and an outlet end 113a. The further heat exchanging arrangement 111 comprises an inlet end 113b and an outlet end 112b. For storing thermal energy into the thermal energy storage and recovery device 100 a hot heat transfer fluid with a temperature t1 is fed into the inlet end 112a and is returned via the outlet end 113a with the temperature t2. For recovering thermal energy from the thermal energy storage and recovery device 100 a comparatively cold heat transfer fluid with a temperature t3 is fed into the inlet end 113b and is returned via the outlet 112b with a temperature t4.

The thermal energy storage and recovery device 100 further comprises fluid terminal 115a, 115b, 116a and 116b, which, as will be described below in more detail, are usable for inserting a fluid of a specific temperature into the heat exchanging arrangement 110 respectively the further heat exchanging arrangement 111. Thereby, a desired spatial temperature profile or desired spatial temperature gradient along the extension of the heat exchanging arrangement 110 respectively of the further heat exchanging arrangement 111 may be maintained or reestablished.

As can be seen from FIG. 1, the fluid terminal 115a is operatively connected to the heat exchanging arrangement 110 via a branch duct 115b and the fluid terminal 116a is operatively connected to the heat exchanging arrangement 110 via a branch duct 116b. Correspondingly, the fluid terminal 117a is operatively connected to the heat exchanging arrangement 110 via a branch duct 117b and the fluid terminal 118a is operatively connected to the heat exchanging arrangement 110 via a branch duct 118b.

It is mentioned that the thermal energy storage and recovery device 100 may also be realized by means of only one heat exchanging arrangement. This means that both the charging of the thermal energy storage and recovery device 100 with thermal energy and the discharging of the thermal energy storage and recovery device 100 (thermal energy is released) is carried out with an appropriate flow of heat transfer fluid through the only one heat exchanging arrangement. A first flow direction of the heat transfer fluid when charging the thermal energy storage and recovery device 100 may be opposite with respect to a second flow direction of the heat transfer fluid when discharging the thermal energy storage and recovery device 100. In this case the known counter current principle is used for a charge/discharge cycle of the thermal energy storage and recovery device 100.

As may be seen in the bottom of FIG. 1, the discharging heat transfer fluid reaches almost the same temperature t4 as the inlet temperature t1 of the charging fluid. This temperature behavior is realized because of two reasons:

(A) The spatial temperature gradient along the extension of the heat exchanging arrangement 110 and/or the further heat exchanging arrangement 111 may be kept within an interior region of the thermal energy storage and recovery device 100 (a) by inserting hot (heat transfer) through the fluid terminal 115a and/or through the fluid terminal 117a and (b) by inserting cold (heat transfer) through the fluid terminal 116a and/or through the fluid terminal 118a. As a consequence, the temperature along the extension of the heat exchanging arrangement 110 and/or along the extension of the further heat exchanging arrangement 111 is at least approximately constant within end regions being located adjacent to the inlet end 112a, the outlet end 112b, the inlet end 113a and the outlet end 113b.

(B) A long thermal interaction length between (a) the heat exchanging arrangement 110 and the further heat exchanging arrangement 111 on the one side and (b) the heat storage material 108 on the other side.

(C) The use of a counter current heat exchanging principle for charging/discharging the thermal energy storage and recovery device 100, whereby the temperature gradients for both charging and discharging of the thermal energy storage and recovery device 100 are maintained at least approximately constant throughout the length of the stream of the counter current system. The temperature curve for the "discharging" heat transfer fluid looks almost the same as the temperature curve for the "charging" heat transfer fluid, it is just displaced by a distance d while the inlet temperature and outlet temperature are the same or nearly the same for the two heat transfer fluids.

As schematically illustrated in FIG. 1, a control device 120, may be coupled to a fluid terminal and which is configured such that a flow of fluid through the fluid terminal is controllable in such a manner that within the heat exchanging arrangement 110 a spatial temperature profile along at least a portion of the thermal interaction region is adjustable. The described control device 120 may be realized by a data processing device, which based on appropriate software program (s) is capable of controlling the operation of the described thermal energy storage and recovery device. However, it is pointed out that the described control unit 120 may also comprise hardware components such as e.g. valves for controlling the flow of the (heat transfer) fluid and actuators for controlling a setting of the valves. Thereby, the valves, which may be located close to the respective fluid terminal, may be realized e.g. by means of appropriate swivel doors and/or dam shutters.

Figure 2:
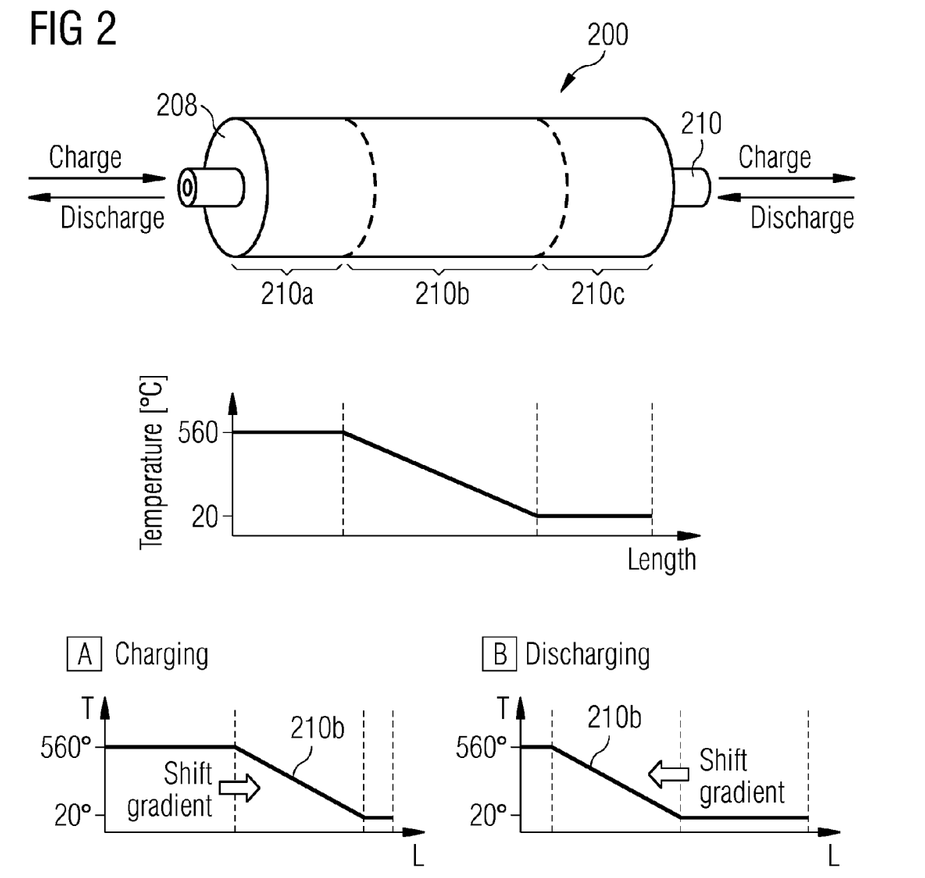
FIG. 2 illustrates a temperature profile along the pipe of a heat exchanging arrangement, wherein during a thermal charging a gradient of the temperature profile moves in one direction and during a thermal discharging the temperature profile moves in the opposite direction.

FIG. 2 illustrates a temperature gradient along the pipe of a heat exchanging arrangement 210 which is surrounded by a heat storage material 208. As has already been mentioned above, the heat storage material 208 may comprise for instance sand, soil or spoil or any combination of these substances. A thermal energy storage and recovery device 200 being formed by the heat exchanging arrangement 210 and the surrounding heat storage material 208 is charged with thermal energy by inputting a hot heat transfer fluid into the left end of the heat exchanging arrangement 210 and by outputting the cooled down heat transfer fluid from the right end of the heat exchanging arrangement 210. Correspondingly, thermal energy is released from the thermal energy storage and recovery device 200 by inputting a cold fluid into the right end of the heat exchanging arrangement 210 and by outputting heated up fluid at the left end of the heat exchanging arrangement 210.

Although not illustrated in FIG. 2, also the thermal energy storage and recovery device 200 takes benefit from the measures (A), (B) and (C) elucidated above with reference to FIG. 1. As a consequence, when the thermal energy storage and recovery device 200 is partially loaded with thermal energy there has been developed a hot region 210a being located next to the left end of the heat exchanging arrangement 210, wherein the temperature within the hot region 210a is at least approximately constant at e.g. 560° C. Accordingly, there is a cold region 210c being located next to the right end of the heat exchanging arrangement 210, wherein the temperature within the cold region 210c is at least approximately constant at e.g. 20° C. In between the regions 210a and 210c there is given an intermediate region 210b, wherein there is a comparatively strong spatial temperature gradient between the hot temperature of the hot region 210a and the cold temperature of the cold region 210c. This situation is depicted in the insert diagram given directly below the thermal energy storage and recovery device 200.

When the thermal energy storage and recovery device 200 is further charged with thermal energy, the location of the intermediate region 210b comprising the described temperature gradient is shifted towards the right side. The resulting temperature profile is illustrated in the insert diagram being located on the bottom left side of FIG. 2.

When the thermal energy storage and recovery device 200 is further discharged from thermal energy, the location of the intermediate region 210b comprising the described spatial temperature gradient is shifted towards the left side. The resulting temperature profile is illustrated in the insert diagram being located on the bottom right side of FIG. 2.

The temperature gradient may develop within a length of 10 to 20 meters or more depending on different physical parameters like e.g. the flow speed of the heat transfer fluid passing the heat storage medium.

Figure 3:
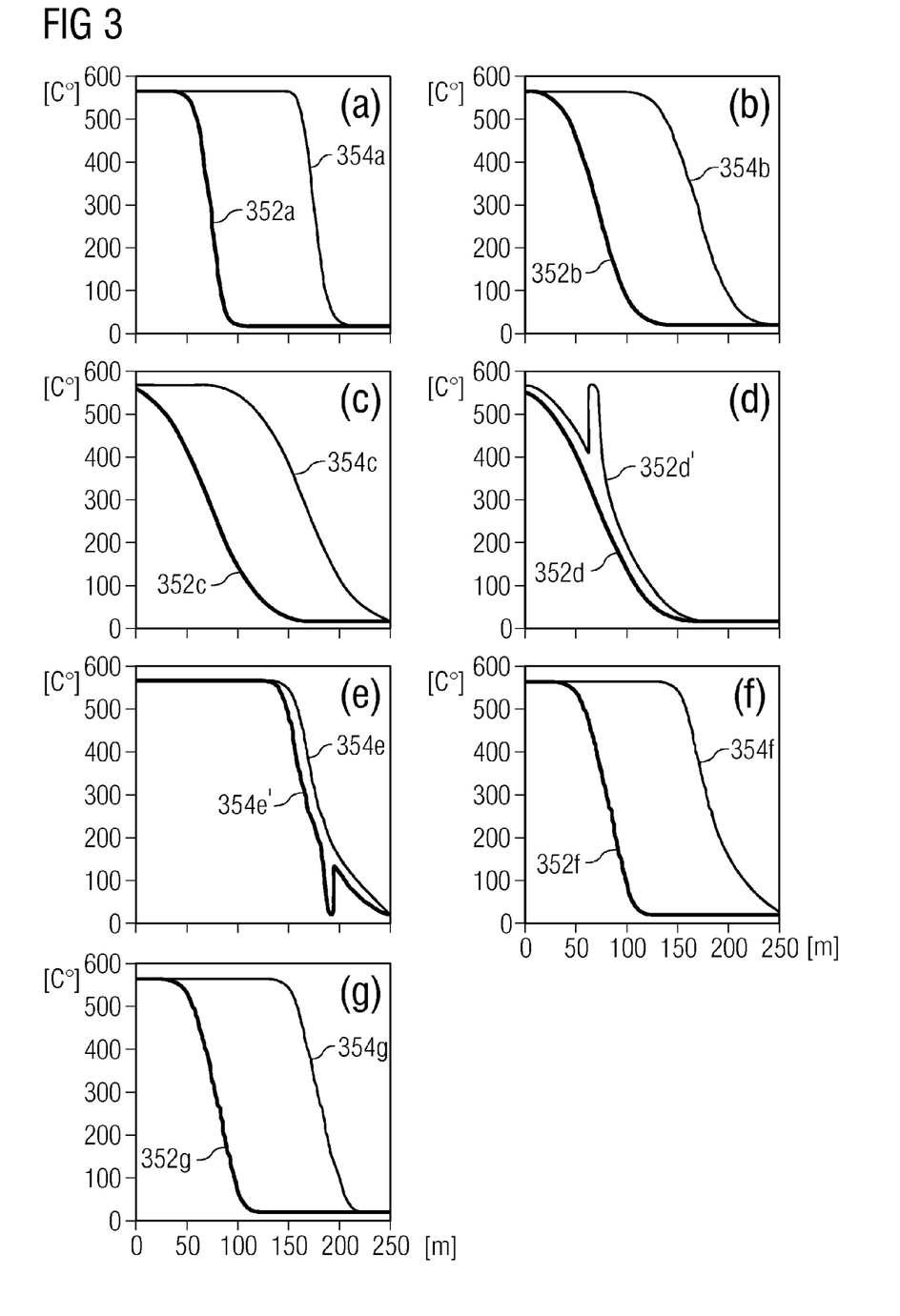
FIG. 3 illustrates a flattening of a spatial temperature profile because of multiple thermal charge/discharge cycles of a thermal energy storage and recovery device and a re-establishing of a desired spatial temperature profile by means of hot and cold heat transfer medium injections.

FIG. 3 illustrates a flattening of a spatial temperature gradient because of multiple thermal charge/discharge cycles of a thermal energy storage and recovery device and a re-establishing of a desired spatial temperature gradient by means of hot and cold heat transfer medium injections. Reference numerals 352a, 352b, 352c, 352d, 352f and 352g denominate various spatial temperature gradients, which appear along the extension of the heat exchanging arrangement when the thermal energy storage and recovery device is at its lowest thermal energy charge level. Reference numerals 354a, 354b, 354c, 354e, 354f and 354g denominate various spatial temperature gradients, which appear along the extension of the heat exchanging arrangement when the thermal energy storage and recovery device is at its highest thermal energy charge level.

According to the embodiment described here the heat exchanging arrangement has a total length of 250 m. The hot end of the heat exchanging arrangement is at a position of 0 m and the cold end of the heat exchanging arrangement is at a position of 250 m. In this respect it is mentioned that in a first operational mode, in which thermal energy is transferred to the thermal energy storage and recovery device, the hot end is the inlet end for hot heat transfer fluid, which during its passage through the heat exchanging arrangement is cooled down. In a second operational mode, in which thermal energy is released from the thermal energy storage and recovery device, the hot end is the outlet end for hot heat transfer fluid, which during its passage through the heat exchanging arrangement has been heated up.

FIG. 3(a) depicts as an example initial spatial temperature profiles/gradients 352a and 354a within a thermal energy storage and recovery device. When operating the thermal energy storage and recovery device in such a manner that the charge level (a) does not fall below a predefined lowest charge level and (b) does not exceed a predefined highest charge level, the actual spatial temperature gradient respectively the actual spatial temperature gradient will always be within the region being bordered by the curves 352a and 354a.

The initial spatial temperature profiles/gradients 352a and 354a owe their shapes to the heat flow characteristics in the thermal energy storage and recovery device during cold conditions (i.e. everywhere is ambient temperature). The heat flow from the charging hot heat transfer fluid (e.g. hot air) into a heat storage material (e.g. sand) of the thermal energy storage and recovery device is proportional to the temperature difference between the heat transfer fluid and the storage material.

In a next charge/discharge cycle, the charge/discharge heat transfer fluid experiences different temperature differences to the storage material due to the existing temperature profile/gradient.

Another way to look at this thermal behavior is the following: The moving charging/discharging heat transfer fluid increases the heat transfer along an axial direction of the heat exchanging arrangement. If the thermal energy storage and recovery device stands still for a while, the gradient will deteriorate due to heat conduction in the heat storage material. If one assumes now for simplicity one kilogram of charging/discharging heat transfer fluid flowing back and forth in a pipe of the heat transfer arrangement. This charging/discharging fluid will warm up when it is in the hot part of the thermal energy storage and recovery device and cool down in the cold part of the thermal energy storage and recovery device. In other words it will transport heat from the hot to the cold part and hence speeds up the flattening effect.

Hence one observes a different heat flow that results in a modified shape of the temperature profile, which is shown in FIG. 3(b).

FIGS. 3(b) and 3(c) show the development of a temperature profile during multiple charging/discharging cycles in thermal energy storage and recovery device. FIG. 3(b) shows spatial temperature profiles 352b and 354b after 5 charging/discharging cycles. As has already been mentioned above the temperature profile 352b appears when the thermal energy storage and recovery device is in its lowest thermal energy charge level and the temperature profile 354b appears when the thermal energy storage and recovery device is in its highest thermal energy charge level.

FIG. 3(c) shows spatial temperature profiles 352c and 354c after 10 charging/discharging cycles. Thereby, the temperature profile 352c appears when the thermal energy storage and recovery device is in its lowest thermal energy charge level and the temperature profile 354c appears when the thermal energy storage and recovery device is in its highest thermal energy charge level.

It will be easily understood from FIG. 3(c) and in particular from the temperature level of curve 352c for 0 m that the output temperature of the heated up heat transfer medium has already started be become reduced because the thermal energy storage and recovery device is already in its lowest thermal energy charge level. If one would continue with further discharging thermal energy, the output temperature of the heated up heat transfer fluid would become lower. In other words, it is not possible to discharge more thermal energy without lowering the output temperature of the heat transfer fluid whereby the efficiency of the thermal energy storage and recovery device is lowered.

Similar considerations apply for charging the thermal energy storage and recovery device. When the thermal energy storage and recovery device is in its highest thermal energy charge level, which is represented by curve 354c, the further charging of thermal energy into the thermal energy storage and recovery device would result into an increase of the output temperature of the originally hot but cooled down heat transfer fluid. This would mean that the temperature level of curve 354c for 250 m would increase. As a consequence, the available temperature difference when charging the thermal energy storage and recovery device would be reduced and the efficiency of the thermal charging would also be reduced.

In other words, the effective storage capacity of the thermal energy storage and recovery device is reduced as the temperature gradient deteriorates (the temperature gradient becomes less sharp and flattens out). In the scenario described here after about 10 charging/discharging cycles the temperature at the cold end begins to rise and, as a consequence, energy needs to be stored in another thermal energy storage and recovery device or energy will be wasted.

FIG. 3(d) shows a charging cycle wherein a hot fluid is inserted via a fluid terminal and a branch duct into the heat exchanging arrangement at a position being located between the two ends of the heat exchanging arrangement. According to the embodiment described here the position is located approximately 75 m away from the hot inlet end of the heat exchanging arrangement and the hot inlet fluid is hot compressed air. Reference numeral 352d denominates the spatial temperature profile along the heat exchanging arrangement at lowest charge level before the hot fluid insertion. Reference numeral 352d' denominates the spatial temperature profile along the heat exchanging arrangement immediately after the hot fluid insertion at the position 75 m. By means of the hot inlet fluid the spatial temperature profile will be restored at least partially and the spatial temperature gradient will become steeper around the shoulder part (see FIG. 3(f)).

FIG. 3(e) shows the spatial temperature profile at highest charge level 354e after one further charge cycle. However, it may be seen that the temperature profile is still comparatively flat and may be improved in the lower temperature range. In order to sharpen the spatial temperature profile also at the (right) side of the lower temperature range the thermal energy storage and recovery device is intentionally discharged by letting cold fluid at a position of 200 m into the heat exchanging arrangement. According to the embodiment described here the cold fluid is (compressed) air having a temperature of approximately 20° C. Reference numeral 354e' shows the spatial temperature profile immediately after the cold air injection. Due to the cold air inlet the spatial temperature profile will be restored at least partially also at the low temperature side and the spatial temperature gradient will become steeper around the low temperature shoulder part (see FIG. 3(g)).

FIG. 3(f) shows the spatial temperature profile after one more charge and one more discharge cycle. For the lowest charge level (see curve 352f) the original temperature profile (see FIG. 3(a)) is fully restored at both ends of the heat exchanging arrangement.

FIG. 3(g) shows the temperature gradient after yet another charging cycle where the spatial temperature profile is also restored for the highest charge level (see curve 354g). The thermal energy storage and recovery device in not saturated anymore (compare FIG. 3(c)).

From this one may conclude that since the described thermal energy storage and recovery device is capable of letting in hot fluid at different locations during a charging cycle (first operational mode) and cold air at other opposite positions during discharging (second operational mode) a desired sharp temperature profile may be restored, which, as illustrated in FIG. 1, comprises (a) a hot region close to the hot end of the heat exchanging arrangement, wherein the temperature is at least approximately constant, (b) a cold region close to the cold end of the heat exchanging arrangement, wherein the temperature is also at least approximately constant, and (c) an intermediate region, wherein there is a comparatively strong spatial temperature gradient between the hot temperature of the hot region and the cold temperature of the cold region.

In other words, the described thermal energy storage and recovery device makes it possible to restore a steep spatial temperature gradient within the heat storage material in such a way that more thermal energy may be stored without raising the temperature in the cold end of the described thermal energy storage and recovery device. The described thermal energy storage and recovery device may be discharged to a lower rate without lowering the temperature in the hot end and hereby maintaining the temperature difference in the thermal energy storage and recovery device and keeping efficiency of the discharge machinery at a high level. It is mentioned that the spatial temperature profile/gradient will not only flatten out due to multiple charging/discharging cycles. It will also become flat if the thermal energy storage and recovery device is left to its own (i.e. no charging, no discharging) because the temperature difference between the hot end and the cold end would level out due to thermal conductivity of the heat storage material and/or of the heat exchanging arrangement.

Generally speaking, the deterioration of the spatial temperature profile/gradient may be eliminated or at least reduced by a thermal energy storage and recovery device having a number of fluid inlets along the thermal storage. This way, it is possible to inject hot or cold fluid at different locations along the heat exchanging arrangement in order to restore or maintain the spatial temperature profile within the thermal energy storage and recovery device.

Figure 4:
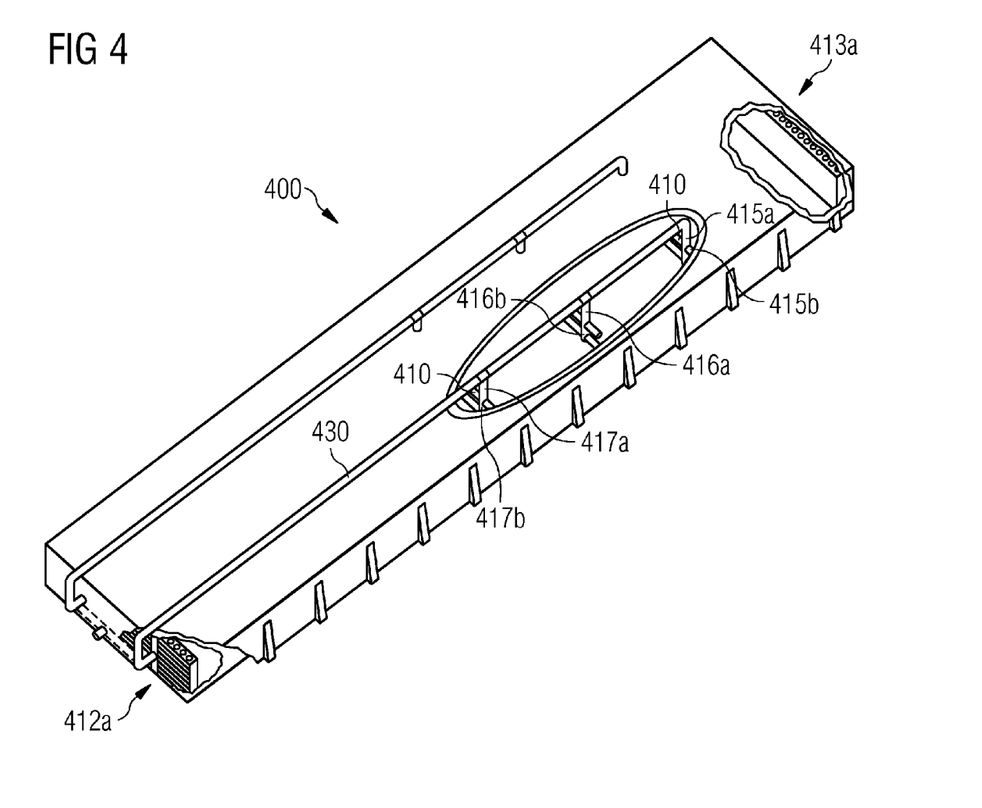
FIG. 4 shows a thermal energy storage and recovery device comprising a plurality of fluid terminals being connected to a heat exchanging arrangement via respectively a branch duct in order to allow for a sharpening of the spatial temperature profile.

FIG. 4 shows a thermal energy storage and recovery device 400 comprising a plurality of fluid terminals 415a, 416a, 417a being connected to a heat exchanging arrangement via respectively a branch duct 415b, 416b, 417b in order to allow for a sharpening of the spatial temperature profile along a heat exchanging arrangement. The thermal energy storage and recovery device 400 comprises a main inlet end 412a at a first end where a hot heat transfer fluid is let in when the thermal energy storage and recovery device 400 is in the first operational mode (i.e. the thermal energy storage and recovery device 400 is charged with thermal energy). The thermal energy storage and recovery device 400 further comprises a main outlet end 413a at a second end where cooled down heat transfer fluid is let out, when the thermal energy storage and recovery device 400 is in the second operational mode (i.e. thermal energy is released from the thermal energy storage and recovery device 400).

Further the thermal energy storage and recovery device 400 comprises three fluid terminals 415a, 416a, 417a spaced apart from each other along the length of the thermal energy storage and recovery device 400, wherein each fluid terminal 415a, 416a and 417a represents an inlet for fluid. The fluid inlets may be controlled independently in such a way that hot or cold fluid may be added at locations for maintaining or restoring a desired spatial temperature profile along the thermal energy storage and recovery device 400. It is of course possible to have different numbers of such fluid inlets distributed along the thermal energy storage and recovery device 400.

According to the embodiment described here the fluid terminals 415a, 416a, 417a are connected to a common feed pipe 430. By means of the common feed pipe 430 a fluid having an appropriate temperature may be transferred to thermal energy storage and recovery device 400 in order to restore or maintain a desired spatial temperature profile along the thermal energy storage and recovery device 400.

The thermal energy storage and recovery device 400 is designed for a sensible heat storage where a hot (e.g. 550° C.) gaseous fluid is passed through the thermal energy storage and recovery device 400 containing a storage material like gravel or stones. The hot gaseous fluid, which could be ambient air, is heated up by adiabatic compression and passed through the thermal energy storage and recovery device 400 whereby the heat transfer fluid is cooled down as it passes through the thermal energy storage and recovery device 400 such that the heat storage material is heated up. According to the embodiment described here the gaseous fluid is cooled down to ambient temperature, which in many practical cases may be a temperature of about 80° C.

As has already been mentioned above the thermal energy storage and recovery device 400 is thermally discharged by reversing the cycle such that a cold fluid (ambient air of e.g. 20° C.) is passed through the thermal energy storage and recovery device 400 from the cold end 413a to the hot end 412a in such a way that energy is transferred from the hot heat storage material to the heat transfer fluid. The heated up heat transfer fluid leaves the thermal energy storage and recovery device 400 at the hot end 412a having approximately and ideally the same temperature as the temperature of the heat storage material within a region close to the hot end 412a.

Figure 5:
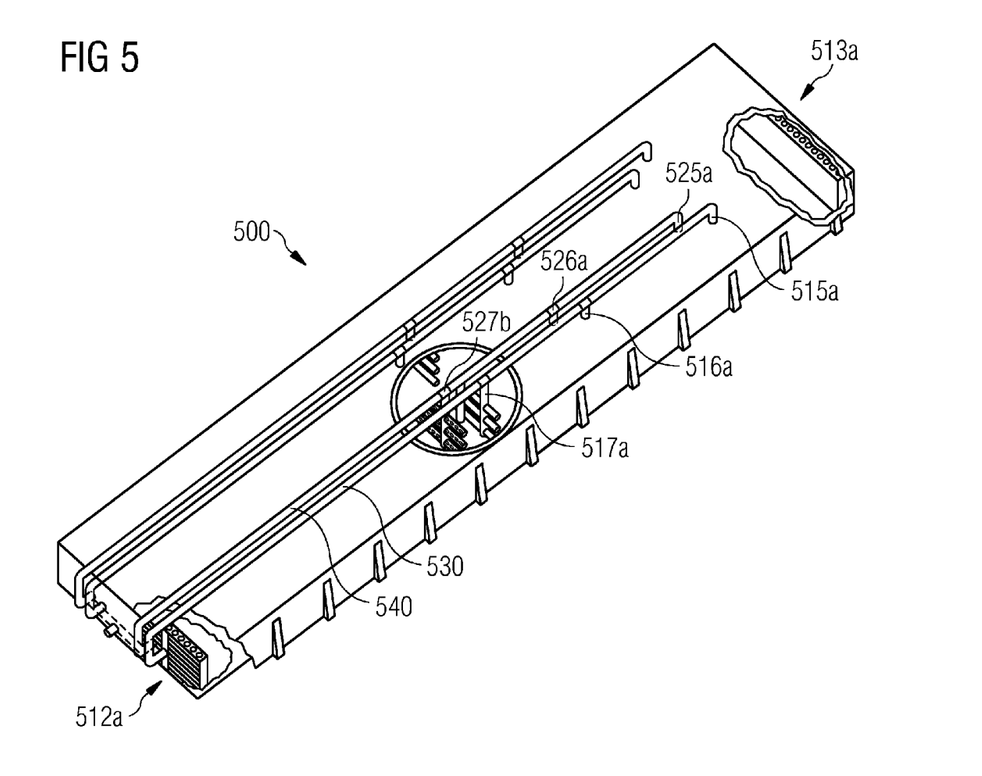
FIG. 5 shows a thermal energy storage and recovery device with two common feed pipes each being used for supplying a fluid having a certain temperature.

FIG. 5 shows a thermal energy storage and recovery device 500 with two common feed pipes 530, 540 each being used for supplying a fluid having a certain temperature. The thermal energy storage and recovery device 500 comprises an inlet end 512a and an outlet end 513a. In between the inlet end 512a and the outlet end 513a there are provided several fluid terminals 515a, 516a, 517a, 525a, 526a and 527a. The fluid terminals 515a, 516a and 517a are connected to a common feed pipe 530. According to the embodiment described here the common feed pipe 530 is used for supplying a hot fluid to the connected fluid terminals 515a, 516a and 517a. Accordingly, the fluid terminals 525a, 526a and 527a are connected to a further common feed pipe 540. According to the embodiment described here the further common feed pipe 540 is used for supplying a cold fluid to the connected fluid terminals 525a, 526a and 527a.

Figure 6:
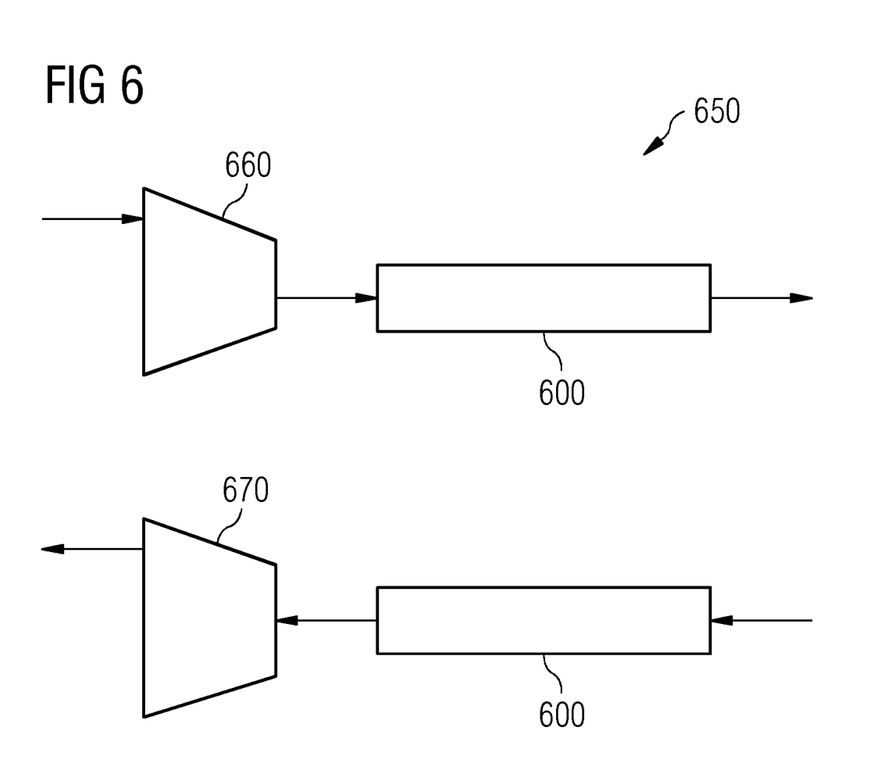
FIG. 6 shows a configuration of a thermal energy storage and recovery system, wherein a thermal energy storage and recovery device in accordance with embodiments described in this document could be used.

FIG. 6 shows a configuration of a thermal energy storage and recovery system 650, which may also be denominated a thermal energy storage plant. The thermal energy storage and recovery system 650 comprises a thermal energy storage and recovery device 600, which could be e.g. any thermal energy storage and recovery device described in this document.

In a first operational mode (i.e. thermal energy is stored in the thermal energy storage and recovery device) a hot inlet end of the thermal energy storage and recovery device 600 is connected to a heat generating arrangement 660. According to the embodiment described here the heat generating arrangement 660 comprises an adiabatic compressor, which converts electric energy provided e.g. by a wind turbine into heat by adiabatically compressing air.

In a second operational mode (i.e. thermal energy is released from the thermal energy storage and recovery device) a hot outlet end of the thermal energy storage and recovery device 600 is connected to a heat consumption arrangement 670. According to the embodiment described here the heat consumption arrangement 670 comprises an expander turbine with an electric generator, which converts the energy being stored in hot compressed air in electricity.

According to the embodiment described here the temperature of the charging heat transfer fluid is 550° C. The heat transfer fluid is a gas such as compressed ambient air or any other compressed gas.

When charging the thermal energy storage and recovery device 600 with thermal energy the gas is compressed and heated up adiabatically by means of the adiabatic compressor 660. When moving through the thermal energy storage and recovery device 600 the gas cools down and leaves the thermal energy storage and recovery device 600 at a lower temperature (e.g. at ambient temperature).

When discharging the thermal energy storage and recovery device 600 a compressed gas at ambient temperature is let through the thermal energy storage and recovery device 600. During its passage through the thermal energy storage and recovery device 600 the compressed gas heats up and leaves the thermal energy storage and recovery device 600 having a high temperature. Then, the heated up gas passes an expander turbine which is mechanically coupled to a not depicted electric generator, which is capable of producing electric energy.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A thermal energy storage and recovery device, comprising a heat exchanging arrangement having a first end and a second end, wherein the heat exchanging arrangement is configured for guiding a flow of a heat transfer fluid between the first end and the second end, a heat storage material, which is thermally coupled to the heat exchanging arrangement such that along a physical extension between the first end and the second end of the heat exchanging arrangement a thermal interaction region is formed that thermally couples the heat transfer fluid with the heat storage material, a fluid terminal, which is connected to the heat exchanging arrangement via a branch duct of the heat exchanging arrangement, wherein the branch duct is located between the first end and the second end, and a control device, which is coupled to the fluid terminal and which is configured to control a flow of fluid through the fluid terminal so as to adjust within the heat exchanging arrangement a spatial temperature profile along at least a portion of the thermal interaction region; and a further fluid terminal, which is connected to the heat exchanging arrangement via a further branch duct of the heat exchanging arrangement, wherein also the further branch duct is located between the first end and the second end and wherein the branch duct and the further branch duct are spatially distributed along the physical extension of the heat exchanging arrangement.

2. The thermal energy storage and recovery device as set forth in claim 1,
wherein a plurality of branch ducts with corresponding fluid terminals are provided along the heat exchanging arrangement, and
wherein a density of the branch ducts along the physical extension of the heat exchanging arrangement in an end region being located adjacent to the first end or to the second end is higher than a density of the branch ducts along the physical extension of the heat exchanging arrangement in an middle region being located in between the first end and the second end.

3. The thermal energy storage and recovery device as set forth in claim 1,
wherein the control device is configured for controlling the flow of fluid through the various fluid terminals independent from each other.

4. The thermal energy storage and recovery device as set forth in claim 1,
wherein the fluid terminal and/or the further fluid terminal are configured for allowing fluid to enter the heat exchanging arrangement and for preventing fluid to leave the heat exchanging arrangement.

5. The thermal energy storage and recovery device as set forth in claim 1, wherein the heat storage material comprises a solid material selected from the group consisting of sand, soil, ashes, stones gravel, and combinations thereof.

6. The thermal energy storage and recovery device as set forth in claim 1,
wherein the physical extension of the heat exchanging arrangement is at least 80 m.

7. The thermal energy storage and recovery device as set forth in claim 1, further comprising
a thermal insulator for thermally isolating the whole thermal energy storage and recovery device from its environment and/or for thermally isolating different compartments of the thermal energy storage and recovery device from each other.

8. The thermal energy storage and recovery device as set forth in claim 1, further comprising
a first common feed pipe being connected to at least two first terminals being selected from the fluid terminal and the at least one further fluid terminal for inserting a hot fluid into the heat exchanging arrangement; and/or a second common feed pipe being connected to at least two second terminals being selected from the fluid terminal and the at least one further fluid terminal for inserting a cold fluid into the heat exchanging arrangement,
wherein the first terminals are different from the second terminals,
wherein the temperature of the hot fluid is higher than the temperature of the cold fluid,
wherein the hot fluid is used for heating up the heat transfer fluid within the heat exchanging arrangement, and
wherein the cold fluid is used for cooling down the heat transfer fluid within the heat exchanging arrangement.

9. A method for adjusting a temperature profile along a heat exchanging arrangement of a thermal energy storage and recovery device as set forth in claim 1, the method comprising
guiding a flow of the heat transfer fluid between the first end and the second end and
controlling a flow of fluid through the fluid terminal in such a manner that within the heat exchanging arrangement a spatial temperature profile along at least a portion of the thermal interaction region is adjusted.

10. The method as set forth in claim 9,
wherein the fluid and/or the heat transfer fluid is a compressed gas.

11. The method as set forth in claim 9,
wherein in a first operational mode, in which the heat storage material receives thermal energy from the heat transfer fluid, the heat transfer fluid is transported from the first end and to the second end, and
wherein in a second operational mode, in which the heat storage material releases thermal energy to the heat transfer fluid, the heat transfer fluid is transported from the second end and to the first end.

12. A thermal energy storage and recovery system, comprising:
the thermal energy storage and recovery device as set forth in claim 1,
a heat generating arrangement, which is connected directly or indirectly to the thermal energy storage and recovery device and which is configured to heat up heat transfer fluid, which is supposed to be transported to the thermal energy storage and recovery device, and
a heat consumption arrangement, which is connected directly or indirectly to the thermal energy storage and recovery device and which is configured to receive thermal energy from heat transfer fluid, which has been heated up by the thermal energy storage and recovery device.

13. The thermal energy storage and recovery system as set forth in claim 12,
wherein the heat generating arrangement is configured for generating a compressed hot gas being used for the heat transfer fluid in case the thermal energy storage and recovery device is in the first operational mode.

14. The thermal energy storage and recovery system as set forth in claim 12,
wherein the heat consumption arrangement comprises an expanding apparatus, which may be driven by an expanding heat transfer fluid being provided by the thermal energy storage and recovery device in case the thermal energy storage and recovery device is in the second operational mode.

* * * * *